April 2, 1963    A. P. H. JENNINGS ETAL    3,083,565
DEWPOINT HYGROMETER
Filed June 20, 1958
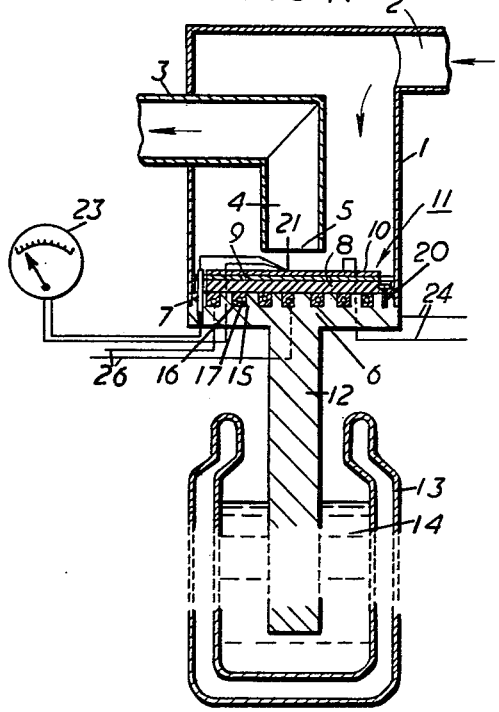
INVENTORS
ALFRED P. H. JENNINGS
AND BERNARD A. WORSWICK
BY
John F. Lehrs
ATTORNEY

United States Patent Office 3,083,565
Patented Apr. 2, 1963

3,083,565
DEWPOINT HYGROMETER
Alfred P. H. Jennings and Bernard A. Worswick, Croydon, England, assignors to Bailey Meter Company, Cleveland, Ohio, a corporation of Delaware
Filed June 20, 1958, Ser. No. 743,315
7 Claims. (Cl. 73—17)

This invention relates to methods of and apparatus for indicating or/and recording the dewpoint of vapour-containing gaseous fluid.

In hygrometry, the usual method of determining the dewpoint of air containing water vapour is to measure the temperature of a surface exposed to the air and cooled to the minimum extent necessary for moisture or ice to deposit thereon from the sample of vapour in contact with the surface. The selection of the amount of cooling necessary is a matter of considerable delicacy, for it depends upon perceiving by eye or by means of a light-sensitive cell the moment when a thin film of deposit just forms on or just evaporates from the surface.

An object of the present invention is to provide methods of and apparatus for indicating or/and recording the dewpoint of vapour-containing gaseous fluid which dispense with the need to observe the presence or absence of a thin film of deposit on a cooled surface exposed to the gaseous fluid.

Another object of the invention is to provide improved apparatus for automatically indicating or/and recording the dewpoint of vapour-containing gaseous fluid.

The invention includes the method of indicating or/and recording the dewpoint of vapour-containing gaseous fluid which includes obtaining a comparison of the relative humidity of a sample of the gaseous fluid with a predetermined value of relative humidity of less than 100%, heating or cooling the said sample in accordance with said comparison to regulate its relative humidity to the said predetermined value, obtaining a measure of the temperature of the said sample when so heated or cooled, and converting said measure of temperature into an indication or/and a record of the dewpoint of the gaseous fluid.

If a vapour-containing gaseous fluid is cooled or heated so that its relative humidity assumes some predetermined value, a measure of the temperature to which the gaseous fluid has been lowered or raised is equivalent to a measure of the dewpoint, for there is a relation which is capable of being determined between the dewpoint and the temperature at which the gaseous fluid has the said predetermined value of relative humidity. Measurement of the instantaneous value of the relative humidity will indicate whether the gaseous fluid under test must be lowered in temperature to bring its relative humidity up to the predetermined value, or whether it must be raised in temperature to bring its relative humidity down to the predetermined value. In some cases it may be sufficient to provide means for withdrawing heat from the gaseous fluid continuously or intermittently at a variable rate, in other cases it may be sufficient to provide means for releasing heat to the gaseous fluid continuously or intermittently at a variable rate, in yet other cases it may be necessary or desirable to provide both means for withdrawing heat from and means for releasing heat to the gaseous fluid.

The invention also includes apparatus for indicating or/and recording the viewpoint of a vapour-containing gaseous fluid, comprising means for obtaining a measure of the relative humidity of a sample of the gaseous fluid, means for varying the temperature of the said sample operative automatically in dependence upon said measure to regulate the relative humidity to a predetermined value less than 100%, means for obtaining a measure of the temperature of the said sample, and means for displaying said measure of temperature against a scale, or/and recording said measure on a chart, calibrated with reference to the dewpoint of the gaseous fluid.

The invention moreover includes apparatus for indicating or/and recording the dewpoint of vapour-containing gaseous fluid, comprising a hygrometer in which the capacitance of a condenser having in its di-electric space porous material exposed to gaseous fluid is a measure of the relative humidity of the gaseous fluid, means for obtaining a measure of the capacitance of the condenser, means for varying the temperature of the condenser, automatic control means operative in dependence upon the measure of capacitance so to control the means for varying condenser temperature as to regulate the capacitance to a value corresponding to a predetermined value of relative humidity less than 100%, means for obtaining a measure of the temperature of the condenser, and means for displaying said measure of temperature against a scale, or/and recording said measure on a chart, calibrated with reference to the dewpoint of the gaseous fluid.

The invention will now be described, by way of example, with reference to the accompanying diagrammatic drawings, in which:

FIGURE 1 is a view in sectional elevation of an assembly for use in indicating the dewpoint of a stream of air containing water vapour;

FIGURE 2 schematically illustrates a condenser temperature control system for the arrangement of FIGURE 1;

FIGURE 3 schematically illustrates a modification of the control system of FIGURE 2; and FIGURE 4 illustrates a modification of the assembly of FIGURE 1.

Referring to FIGURES 1 and 2 of the drawings, a stream of air which contains water vapour and of which the dewpoint is to be indicated is arranged to flow through a cylindrical vessel 1 of plastic material and of upright axis; the air entry 2 to the vessel is at the upper end thereof while the air leaves the vessel through an outlet tube 3 the initial length 4 of which extends axially of the vessel with its mouth 5, through which air enters the outlet tube, open downwardly.

The lower end of the vessel is closed by a copper disc 6; the upper end of the copper disc is reduced in diameter and the lower end of the cylindrical wall of the vessel fits tightly therearound. Within the vessel an aluminium disc 8 about $1/16$ inch thick and of the same diameter, about 1 inch, as the copper disc upper end 7 contacts the upper face of the copper disc upper end over its whole area, and is secured to the copper disc by a number of screws 20 (of which one only is visible in FIGURE 1) positioned near the periphery of the aluminium disc and equiangularly spaced therearound and having their heads below the level of the surface of the aluminium disc.

The upper surface of the aluminium disc has been subjected to an anodising process to form thereon over its whole area porous aluminium oxide layer 9 of the order of 6 to $60 \times 10^{-4}$ cm. thick, and on the aluminium oxide layer 9 to a thin porous conductive layer 10 has been formed by painting onto the oxide a thing coating of the graphite preparation known as aquadag, or alternatively by condensing metal onto the oxide from a metal vapour. The porous conductive layer 10 of which the diameter is less than that of the aluminium oxide layer and that of the upper end of the copper disc does not extend radially outwardly as far as the recess for the heads of the screws 20 securing the aluminium disc to the copper disc. The aluminium disc 8 constitutes one plate of an electric condenser 11 of which the aluminium oxide layer 9 constitutes the dielectric and the porous conductive layer 10 constitutes the other plate of the condenser.

The copper disc is cooled by means of a copper rod 12 formed integrally therewith and extending vertically downwardly therefrom through the open neck of a vacuum flask 13 into a bath in the vacuum flask interior of a volatile liquid 14, e.g. petrol or ether, which will assume, by reason of its evaporation, a temperature sufficiently low for the purpose to be indicated. The liquid temperature may be reduced if air is bubbled through the liquid. The face of the upper end 7 of the copper disc 6 is formed with a groove 15 which extends in turns around the axis of the copper disc in the form of a spiral and in the groove 15 there is arranged, spaced from the sides and bottom of the groove and from the aluminium disc 8 by electrical insulating material 16, an electric heating element 17 suitably in the form of coiled resistance wire.

The temperature of the condenser is obtained by a thermo-couple junction 21 in contact with the porous conductive layer 10. The thermo-couple junction connections lead to an indicator 23 the pointer of which moves over a scale indicating dewpoint. Leads 24 on the one hand making a connection with the porous conductive layer 10 and on the other hand making a connection with the copper disc 6 which electrically contacts the aluminium disc 8 incorporates the condenser 11 in an alternating current bridge 25 the output from which is arranged to control the heating current led to and from the heating element through leads 26.

The condenser 11 comprises one arm of the A.C. bridge 25, in which two adjacent balance arms consist of equal resistances 27 and 28 and the fourth or comparison arm, adjacent the condenser 11, consists of a condenser 29 of capacitance higher or lower than any value which can be assumed by the condenser 11, so that the bridge is always unbalanced in the same sense. The bridge output is passed through an amplifier 30 and a rectifier 31 to a direct current relay 32 of which the contacts 33 are in the circuit of the heating element 17.

The di-electric constant of the aluminium oxide layer 9, which is exposed through the porous conductive layer 10 to the water-vapour-containing air stream, is large; this phenomenon is thought to be due to the adsorption of water on the sides of the pores of the aluminium oxide.

The capacitance of the condenser 11, which has the aluminium oxide in its di-electric space, varies with the relative humidity of the air and in practice, within a useful range, not with the temperature of the condenser. It is arranged that by automatic control of the temperature of the condenser and so of the temperature of the air sample in contact with it the capacitance of the condenser is regulated to a predetermined value corresponding to a predetermined value of the relative humidity of such air sample, preferably a value of relative humidity within the range 40% to 60% relative humidity.

To this end, the rate of heat withdrawal from the condenser by the copper rod 12 is to be so large, and the rate of heat release by the heating element 17, when operated, is to be so large, that by an on-off control of the heating element 17 the air in contact with the condenser may be adjusted, whatever the relative humidity over the expected range of air entering the hygrometer, to a mean temperature at which its relative humidity has the predetermined value. It is arranged that when the condenser capacitance assumes any value corresponding too high a relative humidity of the air in contact with the condenser the contacts 33 will be closed and when the condenser capacitance assumes any value corresponding to too low a relative humidity of the air in contact with the condenser the contacts 33 will be opened.

In the operation of the apparatus, the capacitance of the condenser 11 assumes a value dependent upon the relative humidity of the air in contact with the condenser and if the capacitance is not the same as the predetermined value of capacitance corresponding to the predetermined value of relative humidity, for instance if the relative humidity of the air in contact with the condenser is less than the predetermined relative humidity value, the contacts 33 in the heater element circuit are open or will be opened, the condenser 11 will fall in temperature, cooling the air in contact with it. The cooling of the air increases its relative humidity. When the temperature fall comes to be such that the relative humidity of the air in contact with the condenser exceeds the predetermined relative humidity value, the contacts 33 in the heating element circuit will be closed, whereupon the heating by the heating element will ensure that the condenser temperature will cease to fall and will commence to rise. When the condenser temperature rises the air in contact with the condenser will come to assume a relative humidity less than the predetermined value and the contacts 33 will re-open. Thus the contacts 33 will alternately open and close, and the condenser capacitance and the relative humidity of the air in contact with the condenser will be regulated to respective mean values the same as their predetermined values. The temperature of the condenser and of the air in contact with it, of which the E.M.F. of the thermo-couple junction is a measure, is a measure of the dewpoint of the air. For:

The pressure of aqueous vapour when a given sample of air is saturated is a function only of the temperature; let us write $p_T = f(T)$.

Where:

$p_T$ = pressure of saturated vapour
$f(T)$ = function of temperature T

Now when:

$p_{T_D}$ = pressure of saturated vapour at temperature $T_D$
$p_{T_X}$ = pressure of saturated vapour at temperature $T_X$
$N/100$ = predetermined constant relative humidity If $T_D$ is the dewpoint, the relative humidity of air in contact with the condenser at temperature $T_X$ is $p_{T_D}/p_{T_X}$. If the temperature $T_X$ is always adjusted so that the relative humidity has a predetermined value of N% (say), i.e. $N/100$, then $p_{T_D} = N/100 \times p_{T_X}$; and it will be understood that from a measure of $T_X$ the values of $p_{T_X}$, $p_{T_D}$, and finally $T_D$ are deducible in turn. The E.M.F. of the thermo-couple junction, a measure of the condenser temperature, is therefore a measure of the dewpoint and the scale of the indicator 23 over which the pointer thereof moves is calibrated for the display of the dewpoint.

The immediately foregoing discussion applies whatever the chosen value of the pre-determined relative humidity, and a chosen value close to 100% relative humidity might be chosen provided there is sufficient difference for control purposes between the condenser capacitance at the chosen value and the condenser capacitance at 100% relative humidity, and in this case the calibration of the indicator scale would be little different from the calibration appropriate to indicate the actual temperature of the condenser. The variation of capacitance with relative humidity is not at its largest at very low values of relative humidity nor at very large values of relative humidity, for which reason it is preferred to regulate to some value, as stated, within the range 40% to 60% relative humidity, a procedure which incidentally avoids continuous exposure of the condenser to saturated air, a measure which would jeopardize its sensitiveness.

Instead of or in addition to the indicator 23 means may be provided for recording the dewpoint for example, of the type comprising a pen movable over a chart which steadily moves in one direction beneath the pen. In order to minimize the oscillation in a record due to the fact that the on-off nature of the heating control necessitates condenser temperature oscillation about a mean value, the dewpoint recording means may be arranged to record only intermittently, at moments when the relay operates whether to open or to close the contacts 33.

Oscillations in dewpoint indications or recordings may be reduced by replacing the on-off heater control by a control in which the heating element releases heat continuously and the rate of continuous heat release is adjusted. Referring to FIGURE 3, which illustrates a modification of the heating control arrangement of FIGURE 2, the circuit of the heating element 17 includes a rheostat 41. The positioning of the rheostat contact is effected by a reversible motor 42 controlled by a controller 43 associated with the relay 32, which is assumed to have three positions; when the rate of heat release at the condenser is such that the air in contact with the condenser is cooled to a temperature at which its relative humidity has the predetermined value, the relay 32 is in an intermediate position in which it ensures that the motor 42 moves neither in one direction nor in the other, but when the rate of heat release at the condenser is too great or too small for this condition to prevail the relay 32 operates to close a circuit for the drive of the motor in one direction or an alternative circuit for the drive of the motor in the other direction to drive the rheostat contact along the rheostat resistance in the appropriate direction to reduce or to increase respectively the rate of heat release at the condenser.

FIGURE 4 illustrates an alternative method of cooling the cooling disc 6, by allowing to sweep over the face of the cooling disc 6 (with which no cooling rod 12 is associated) opposite to that bearing the heating element 17 the discharge from the cool outlet 51 of a Hilsch tube, a device described in volume 18 on pages 108 to 117 of the Review of Scientific Instruments, which produces from a stream of compressed air introduced through a tangential inlet pipe 52 into a drum 53 a cool air stream and a warm air stream. The temperature of the condenser 11 may be adjusted, in order to regulate the capacitance of the condenser to the predetermined value, by control of the rate of heat release by the heating element 17 or/and by control of the cooling effect of the Hilsch tube cool outlet by adjustment of the throttle 54 in the warm outlet 55 from the Hilsch tube.

We claim:

1. The method of determining the dewpoint of vapour-containing gaseous fluid, which includes obtaining a comparison of the relative humidity of a sample of gaseous fluid with a predetermined value of relative humidity of less than 100%, heating or cooling the said sample in accordance with said comparison to regulate its relative humidity to the said predetermined value, obtaining a measure of the temperature of the said sample when so heated or cooled, and converting said measure of temperature into a determination of the dewpoint of the gaseous fluid.

2. Apparatus for determining the dewpoint of vapour-containing gaseous fluid, comprising means for obtaining an electrical effect having a magnitude dependent on the relative humidity of a sample of the gaseous fluid, means for varying the temperature of the said sample operative automatically in dependence upon said effect to regulate the relative humidity to a predetermined value less than 100%, means for obtaining a measure of the temperature of the said sample, and means for displaying said measure of temperature against a scale calibrated with reference to the dewpoint of the gaseous fluid.

3. Apparatus for determining the dewpoint of vapour-containing gaseous fluid, comprising a hygrometer in which the capacitance of a condenser having in its dielectric space porous material exposed to gaseous fluid varies as the relative humidity of the gaseous fluid, means for obtaining a voltage varying as the capacitance of the condenser, means for varying the temperature of the condenser, automatic control means operative in dependence upon the said voltage to control the means for varying condenser temperature as to regulate the capacitance to a value corresponding to a predetermined value of relative humidity less than 100%, means for obtaining a measure of the temperature of the condenser, and means for displaying said measure of temperature against a scale calibrated with reference to the dewpoint of the gaseous fluid.

4. Apparatus as claimed in claim 3, wherein the condenser comprises an aluminium disc constituting one plate of the condenser, a porous layer of aluminium oxide formed on one side of the disc and constituting the dielectric, and a porous conductive layer formed on the aluminium oxide layer and constituting the other plate of the condenser, the porous conductive layer is exposed to a stream of the gaseous fluid and the other side of the disc is arranged to be cooled or heated as required.

5. Apparatus as claimed in claim 4, wherein means are provided for withdrawing heat from the aluminium disc including a heat conductive rod along which heat travels towards an end thereof located in a bath of volatile liquid in a vacuum flask.

6. Apparatus as claimed in claim 4, where means are provided for withdrawing heat from the aluminium disc including a Hilsch tube.

7. Apparatus as claimed in claim 4, wherein the aluminium disc is secured to a face of a heat conductive disc, a groove in the face of which houses electrical resistance heating means.

References Cited in the file of this patent

UNITED STATES PATENTS

| | | |
|---|---|---|
| 1,708,073 | Allen | Apr. 9, 1929 |
| 2,536,111 | Van Dyke | Jan. 2, 1951 |
| 2,763,150 | O'Bannon | Sept. 18, 1956 |
| 2,897,673 | Wylie | Aug. 4, 1959 |
| 2,913,902 | Ross | Nov. 24, 1959 |

FOREIGN PATENTS

| | | |
|---|---|---|
| 527,686 | Great Britain | Oct. 14, 1940 |